United States Patent [19]
Kelley et al.

[11] Patent Number: 5,733,649
[45] Date of Patent: Mar. 31, 1998

[54] MATRIX FOR A HARD COMPOSITE

[75] Inventors: Harold E. Kelley, Fallon, Nev.;
William E. Silvis, Austin, Tex.;
Charles J. Terry, Fallon, Nev.

[73] Assignee: Kennametal Inc., Latrobe, Pa.

[21] Appl. No.: 710,799

[22] Filed: Sep. 23, 1996

Related U.S. Application Data

[62] Division of Ser. No. 382,468, Feb. 1, 1995, Pat. No. 5,589,268.

[51] Int. Cl.$^6$ ............................................. G32B 9/00
[52] U.S. Cl. ............................ 428/325; 428/323; 428/457; 428/469; 428/472; 428/698; 75/236; 75/255; 501/87; 501/93
[58] Field of Search ............................ 428/212, 325, 428/323, 457, 469, 472, 698; 75/236, 237, 240, 254, 255; 501/87, 93

[56] References Cited

U.S. PATENT DOCUMENTS

| | | |
|---|---|---|
| 3,175,260 | 3/1965 | Bridwell et al. . |
| 3,379,503 | 4/1968 | McKenna . |
| 3,684,497 | 8/1972 | Wendler et al. . |
| 3,779,715 | 12/1973 | Wendler et al. . |
| 3,790,353 | 2/1974 | Jackson et al. ............................ 29/827 |
| 4,025,334 | 5/1977 | Cheney et al. . |
| 4,525,178 | 6/1985 | Hall . |
| 4,604,106 | 8/1986 | Hall et al. . |
| 4,694,918 | 9/1987 | Hall . |
| 4,729,440 | 3/1988 | Hall . |
| 4,834,963 | 5/1989 | Terry et al. . |
| 4,836,307 | 6/1989 | Keshavan et al. . |
| 4,916,869 | 4/1990 | Oliver ............................ 51/293 |
| 4,944,774 | 7/1990 | Keshavan et al. . |
| 5,045,092 | 9/1991 | Keshavan . |
| 5,051,112 | 9/1991 | Keshavan et al. . |
| 5,096,689 | 3/1992 | Terry et al. ............................ 423/440 |
| 5,131,181 | 7/1992 | Smith ............................ 175/428 |
| 5,131,481 | 7/1992 | Smith . |
| 5,166,103 | 11/1992 | Krstic . |
| 5,250,355 | 10/1993 | Newman ............................ 428/367 |
| 5,290,507 | 3/1994 | Runkle . |
| 5,304,342 | 4/1994 | Hall, Jr. et al. . |
| 5,328,763 | 7/1994 | Terry ............................ 428/559 |
| 5,370,195 | 12/1994 | Keshavan et al. ............................ 175/420.2 |

FOREIGN PATENT DOCUMENTS

| | | |
|---|---|---|
| 1320270 | 5/1963 | France . |
| 9214853 | 9/1992 | WIPO . |

OTHER PUBLICATIONS

Smith Tool Diamond Products Catalog (1987–1988).
Jazwinski et al., "Design of Infiltrating Alloy by Powder Technicque," Pr. Kom. Ceram., Ceram. Pol. Akad. Nauk (1974), 21, pp. 277–284 [English Abstract].
International Search Report Mailed 11 Jul. 1996 in Corresponding Pending PCT Patent Application No. PCT/US96/01342.
Prior Art Composition Example D.
Prior Art Composition Example E.
Champagne et al., "Properties of WC—Co/Steel Composites", International Journal of Refractory and Hard Metals, vol. 6, No. 3, Sep. (1987), pp. 155–160.

*Primary Examiner*—Archene Turner
*Attorney, Agent, or Firm*—John J. Prizzi

[57] ABSTRACT

A matrix powder for formation along with an infiltrant into a matrix for use as a wear element or for use in retaining at least one discrete hard element. The matrix powder including macrocrystalline tungsten carbide particles, crushed sintered cemented macrocrystalline tungsten carbide particles, tungsten carbide, and an iron-based component.

9 Claims, 2 Drawing Sheets

1

MATRIX FOR A HARD COMPOSITE

"This is a divisional of application Ser. No. 08/382,468 filed on Feb. 1, 1995 now U.S. Pat. No. 5,589,268."

BACKGROUND OF THE INVENTION

The invention pertains to a hard composite comprising a metal matrix and one or more discrete hard elements held therein wherein the hard composite can be useful as a cutter or a wear member. More particularly, the invention pertains to a diamond composite comprising a matrix composed of carbide-based particulates bonded together by an infiltrant metal with one or more discrete diamond-based elements held therein. It should be understood that the diamond-based element could comprise a discrete-diamond composite or polycrystalline diamond composite having a substrate with a layer of polycrystalline diamond thereon.

Some types of tungsten carbide available for matrix tools include a macrocrystalline tungsten carbide, a crushed sintered cemented macrcocrystalline tungsten carbide having a binder metal (typically cobalt), and a crushed cast tungsten carbide.

Referring to the macrocrystalline tungsten carbide, this material is essentially stoichiometric WC which is, for the most part, in the form of single crystals. Some large crystals of macrocrystalline tungsten carbide are bicrystals. U.S. Pat. No. 3,379,503 to McKenna for a PROCESS FOR PREPARING TUNGSTEN MONOCARBIDE, assigned to the assignee of the present patent application, discloses a method of making macrocrystalline tungsten carbide. U.S. Pat. No. 4,834,963 to Terry et al. for MACROCRYSTALLINE TUNGSTEN MONOCARBIDE POWDER AND PROCESS FOR PRODUCING, assigned to the assignee of the present patent application, also discloses a method of making macrocrystalline tungsten carbide.

Referring to the crushed sintered cemented macrocrystalline tungsten carbide, this material comprises small particles of tungsten carbide bonded together in a metal matrix. For this material as used in this patent application, the crushed sintered cemented macrocrystalline tungsten carbide with a binder (cobalt) is made by mixing together WC particles, Co powder and a lubricant. This mixture is pelletized, sintered, cooled, and then crushed. The pelletization does not use pressure, but instead, during the mixing of the WC particles and cobalt, the blades of the mixer cause the mixture of WC and cobalt to ball up into pellets.

Referring to crushed cast tungsten carbide, tungsten forms two carbides; namely, WC and $W_2C$. There can be a continuous range of compositions therebetween. An eutectic mixture is about 4.5 weight percent carbon. Cast tungsten carbide commercially used as a matrix powder typically has a hypoeutectic carbon content of about 4 weight percent. Cast tungsten carbide is typically frozen from the molten state and comminuted to the desired particle size.

In the past, there have been hard composites comprised of a matrix and discrete hard elements held therein. In the typical case, the matrix comprised carbide-based particulates bonded together by an infiltrant metal and the hard elements comprised diamond-based material.

Referring to the carbide-based particulates, one example of the carbide-based component contains about 67.10 weight percent macrocrystalline tungsten carbide having the following size distribution: between 18.0 and 22.0 weight percent of the macrocrystalline tungsten carbide particles have a size of −80 +120 mesh (the mesh size is made according to ASTM Standard E-11-70), between 25.0 to 30.0 weight percent of the macrocrystalline tungsten carbide particles have a size of −120 +170 mesh, between 29.0 weight percent and 33.0 weight percent of the macrocrystalline tungsten carbide particles have a size of −170 +230 mesh, between 18.0 weight percent and 22.0 weight percent of the macrocrystalline tungsten carbide particles have a size of −230 +325 mesh, and up to 5.0 weight percent of the macrocrystalline tungsten carbide particles have a size of −325 mesh. The matrix further contains about 30.90 weight percent crushed cast tungsten carbide particles having a size of −325 mesh, 1.00 weight percent iron that has an average particle diameter of between 3 micrometers and 5 micrometers, and 1.00 weight percent grade 4600 steel having a particle size of −325 mesh.

The 4600 grade steel has the following nominal composition (weight percent): 1.57 weight percent nickel; 0.38 weight percent manganese; 0.32 weight percent silicon; 0.29 weight percent molybdenum; 0.06 weight percent carbon; and balance iron.

Another example of the carbide-based component comprises about 65 weight percent of macrocrystalline tungsten carbide having a particle size of −80 +325 mesh, 27.6 weight percent tungsten carbide rod milled to an average particle size of 4 to 6 micrometers with superfines removed, 2.8 weight percent tungsten having a particle size of −325 mesh, 2.8 weight percent 4600 grade steel having a particle size of −140 mesh, and 1.8 weight percent of iron having a particle size of −325 mesh.

Another example of a carbide-based particulate component comprises 68 weight percent macrocrystalline tungsten carbide having a size of −80 +325 mesh; 15 weight percent of macrocrystalline tungsten carbide having a size of −325 mesh; 15 weight percent of crushed cast tungsten carbide having a size of −325 mesh; and 2 weight percent nickel having a size of −325 mesh. This nickel is INCO type 123 from International Nickel Company and is a singular spike covered regular shaped powder. The chemical analysis and physical characteristics available from commercial literature reveal the following: The chemical analysis shows a composition of: 0.1 max. carbon, 0.15 max. oxygen, 0.001 max. sulfur, 0.01 max. iron, and balance nickel. The average particle size is 3–7 microns (Fisher Subsieve Size), the apparent density is 1.8–2.7 grams/cc, and the specific surface area is 0.34–0.44 $m^2/g$.

Still another example of a particulate component comprises a 67.0 weight percent crushed cast tungsten carbide having a particle size distribution as follows: between 18.0 and 22.0 weight percent of the crushed cast tungsten carbide particles have a size of −80 +120 mesh, between 25.0 to 30.0 weight percent of the crushed cast tungsten carbide particles have a size of −120 +170 mesh, between 29.0 weight percent and 33.0 weight percent of the crushed cast tungsten carbide particles have a size of −170 +230 mesh, between 18.0 weight percent and 22.0 weight percent of the crushed cast tungsten carbide particles have a size of −230 +325 mesh, and up to 5.0 weight percent of the crushed cast tungsten carbide particles have a size of −325 mesh. The component further has 31.0 weight percent crushed cast tungsten carbide having a particle size of −325 mesh, 1.0 weight percent iron having a particle size of −325 mesh, and 1.0 weight percent 4600 steel having a particle size of −325 mesh.

One example of a suitable infiltrant comprises 63–67 weight percent copper, 14–16 weight percent nickel, and 19–21 weight percent zinc. This material has a specific gravity of 8.5 g/cc and has a melting point of 1100° F. This infiltrant is used in 1/32 inch by 5/16 inch granules. This alloy is identified as MACROFIL 65 by applicants' assignee, and this designation will be used in this application.

Another example of a suitable infiltrant has a nominal composition of 52.7 weight percent copper, 24.0 weight percent manganese, 15.0 weight percent nickel, 8.0 weight percent zinc, 0.15 weight percent boron, and 0.15 weight percent silicon with traces of lead, tin and iron. This infiltrant is sold by Belmont Metals Inc., 330 Belmont Avenue, Brooklyn, N.Y. 11207, under the name designation "VIRGIN binder 4537D" in 1 inch by ½ inch by ½ inch chunks. This alloy is identified as MACROFIL 53 by applicants' assignee, and this designation will be used in this application.

While these earlier matrices for a hard composite have performed in a satisfactory fashion, it would be desirable to provide an improved matrix for a hard composite having improved properties. These properties include impact strength, transverse rupture strength, hardness, abrasion resistance, and erosion resistance. It would also be desirable to provide an improved hard composite that uses the improved matrix material. It would still further be desirable to provide a tool member that includes a tool shank with the improved hard composite affixed thereto wherein the tool member could be used, for example, in conjunction with an oil well drill bit.

SUMMARY OF THE INVENTION

It is an object of the invention to provide an improved matrix powder for a hard composite comprising one or more discrete hard elements held in a matrix composed of carbide-based particulates bonded together by an infiltrant metal wherein the matrix has improved overall properties. It is contemplated that the hard composite could be used in cutting and drilling applications, and that the matrix powder and infiltrant without the hard element could be used in wear applications.

It is another object of the invention to provide an improved hard composite comprising a plurality of discrete hard elements, such as diamond or polycrystalline diamond composite elements, held in a matrix composed of carbide-based particulates bonded together by an infiltrant metal that has improved impact strength.

It is still another object of the invention to provide an improved hard composite comprising a plurality of discrete hard elements, such as diamond or polycrystalline diamond composite elements, held in a matrix composed of carbide-based particulates bonded together by an infiltrant metal that has improved transverse rupture strength.

It is an object of the invention to provide an improved hard composite comprising a plurality of discrete hard elements, such as diamond or polycrystalline diamond composite elements, held in a matrix composed of carbide-based particulates bonded together by an infiltrant metal that has improved hardness.

It is another object of the invention to provide an improved hard composite comprising a plurality of discrete hard elements, such as diamond or polycrystalline diamond composite elements, held in a matrix composed of carbide-based particulates bonded together by an infiltrant metal that has improved erosion resistance properties.

In one form thereof, the invention is a matrix powder for formation along with an infiltrant into a matrix wherein the matrix powder comprises about 100 weight percent crushed sintered cemented macrocrystalline tungsten carbide particles having a particle size of −120 +400 mesh. The composition of the crushed sintered cemented macrocrystalline tungsten carbide comprises between about 6 weight percent and about 13 weight percent cobalt and between about 87 weight percent and about 94 weight percent tungsten carbide.

In another form thereof, the invention is a diamond composite member that comprises a support with a diamond composite affixed to the support. A matrix that comprises a mass of particles held together by an infiltrant. The mass of particles is formed by heating a powder mixture in the presence of an infiltrant wherein the powder mixture comprises: (a) up to about 50 weight percent of the powder being macrocrystalline tungsten carbide particles with a particle size of −80 +325 mesh; (b) up to about 75 weight percent of the mixture would be crushed sintered cemented macrocrystalline tungsten carbide particles of a particle size of −80 +325 mesh, and having the following composition: about 6 weight percent cobalt, a maximum of 1 weight percent iron, a maximum of 1.0 weight percent tantalum, a maximum of 1.0 weight percent titanium, a maximum of 0.5 weight percent niobium, a maximum of 0.5 weight percent of other impurities and the balance macrocrystalline tungsten carbide having an average particle size between about 5 micrometers and about 25 micrometers; (c) up to about 24 weight percent of the mixture being cast tungsten carbide having an average particle size of −270 mesh; (d) between about 0.5 and about 1.5 weight percent of the mixture being principally iron having a particle size of between about 3 micrometers and about 5 micrometers.

BRIEF DESCRIPTION OF THE DRAWINGS

The following is a brief description of the drawings which form a part of this patent application.

DETAILED DESCRIPTION OF SPECIFIC EMBODIMENTS

Figure 1:
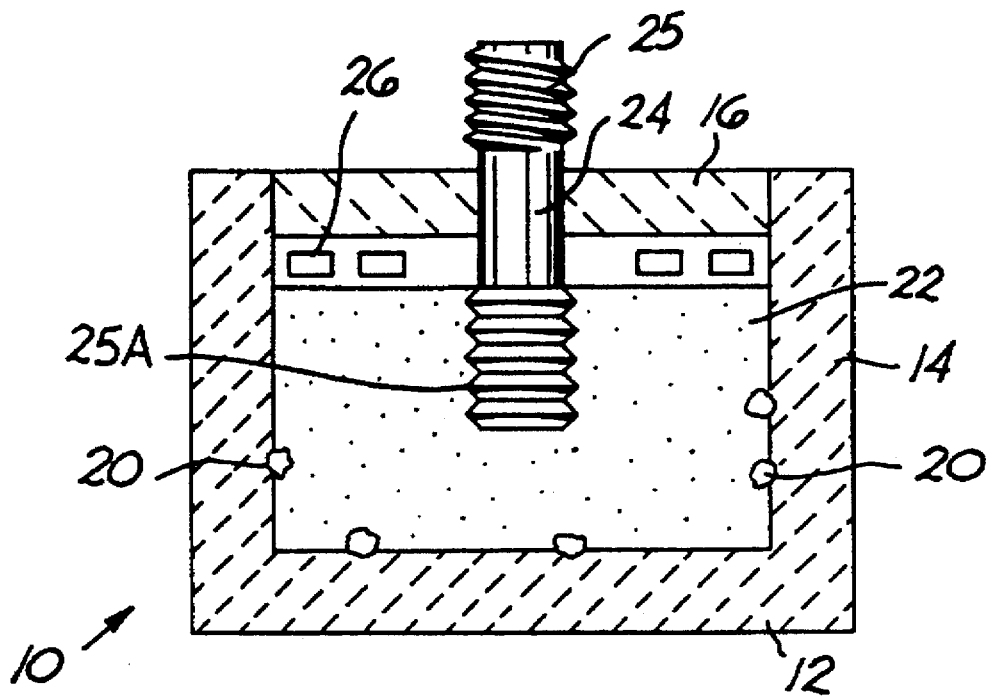
FIG. 1 is a schematic view of the assembly used to make a product comprising a tool shank with one embodiment of the discrete diamonds bonded thereto.

Referring to FIG. 1, there is illustrated a schematic of the assembly used to manufacture a product using the diamond as part of the present invention. The typical product is a drill head. As will become apparent, the drill head has a shank. Cutter elements, such as the discrete diamonds are bonded to the bit head with the metal matrix. Although the method by which the shank is affixed to the drill line may vary, one common method is to provide threads on the shank so that the shank threadedly engages a threaded bore in the drill line. Another way is to weld the shank to the drill line. The production assembly includes a carbon mold, generally designated as 10, having a bottom wall 12 and an upstanding wall 14. The mold 10 defines a volume therein. The assembly further includes a top member 16 which fits over the opening of the mold 10. It should be understood that the use of the top number 16 is optional depending upon the degree of atmospheric control one desires.

A steel shank 24 is positioned within the mold before the powder is poured therein. A portion of the steel shank 24 is within the powder mixture 22 and another portion of the steel shank 24 is outside of the mixture 22. Shank 24 has threads 25 at one end thereof, and grooves 25A at the other end thereof.

Referring to the contents of the mold, there are a plurality of discrete diamonds 20 positioned at selected positions within the mold so as to be at selected positions on the surface of the finished product. The matrix powder 22 is a carbide-based powder which is poured into the mold 10 so as to be on top of the diamonds 20. The composition of the matrix powder 22 will be set forth hereinafter.

Once the diamonds 20 have been set and the matrix powder 22 poured into the mold, infiltrant alloy 26 is positioned on top of the powder mixture 22 in the mold 10. Then the top 16 is positioned over the mold, and the mold is placed into a furnace and heated to approximately 2200° F. so that the infiltrant 26 melts and infiltrates the powder mass. The result is an end product wherein the infiltrant bonds the powder together, the matrix holds the diamonds therein, and the composite is bonded to the steel shank.

Figure 2:
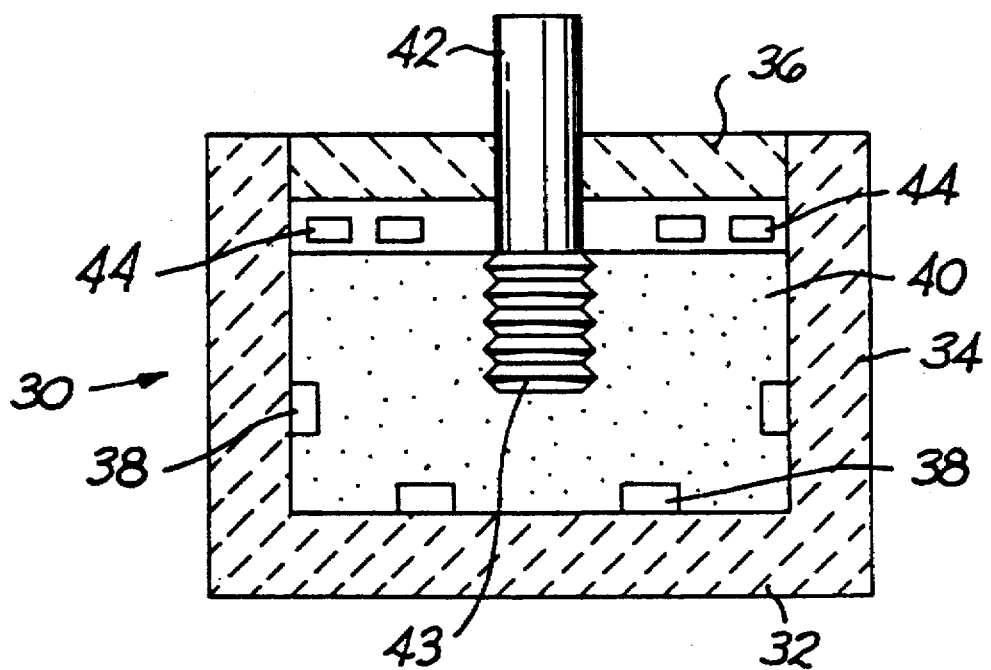
FIG. 2 is a schematic view of the assembly used to make a product comprising a tool shank with another embodiment of the diamond composite bonded thereto.

Referring to FIG. 2, there is illustrated a schematic of the assembly used to manufacture a second type of product using the diamond composites as part of the present invention. The assembly includes a carbon mold, generally designated as 30, having a bottom wall 32 and an upstanding wall 34. The mold 30 defines a volume therein. The assembly further includes a top member 36 which fits over the opening of the mold 30. It should be understood that the use of the top member 36 is optional depending upon the degree of atmospheric control one desires.

A steel shank 42 is positioned within the mold before the powder mixture is poured therein. A portion of the steel shank 42 is within the powder mixture 40 and another portion of the steel shank 42 is outside of the mixture. The shank 42 has grooves 43 at the end that is within the powder mixture.

Referring to the contents of the mold 30, there are a plurality of carbon blanks 38 positioned at selected positions within the mold so as to be at selected positions on the surface of the finished product. The matrix powder 40 is a carbide-based powder which is poured into the mold 30 so as to be on top of the carbon blanks 38. The composition of the matrix powder 40 will be set forth hereinafter.

Once the carbon blanks 38 have been set and the matrix powder 40 poured into the mold 30, infiltrant alloy 44 is positioned on top of the powder mixture in the mold. Then the top 36 is positioned over the mold, and the mold is placed into a furnace and heated to approximately 2200° F. so that the infiltrant melts and infiltrates the powder mass. The result is an intermediate product wherein the infiltrant bonds the powder together, also bonding the powder mass to the steel shank, and the carbon blanks define recesses in the surface of the infiltrated mass.

The carbon blanks are removed from bonded mass and a diamond composite insert, having a shape like that of the carbon blank, is brazed into the recess to form the end product. Typically, the diamond composite drill head has a layer of discrete diamonds along the side.

Figure 3:
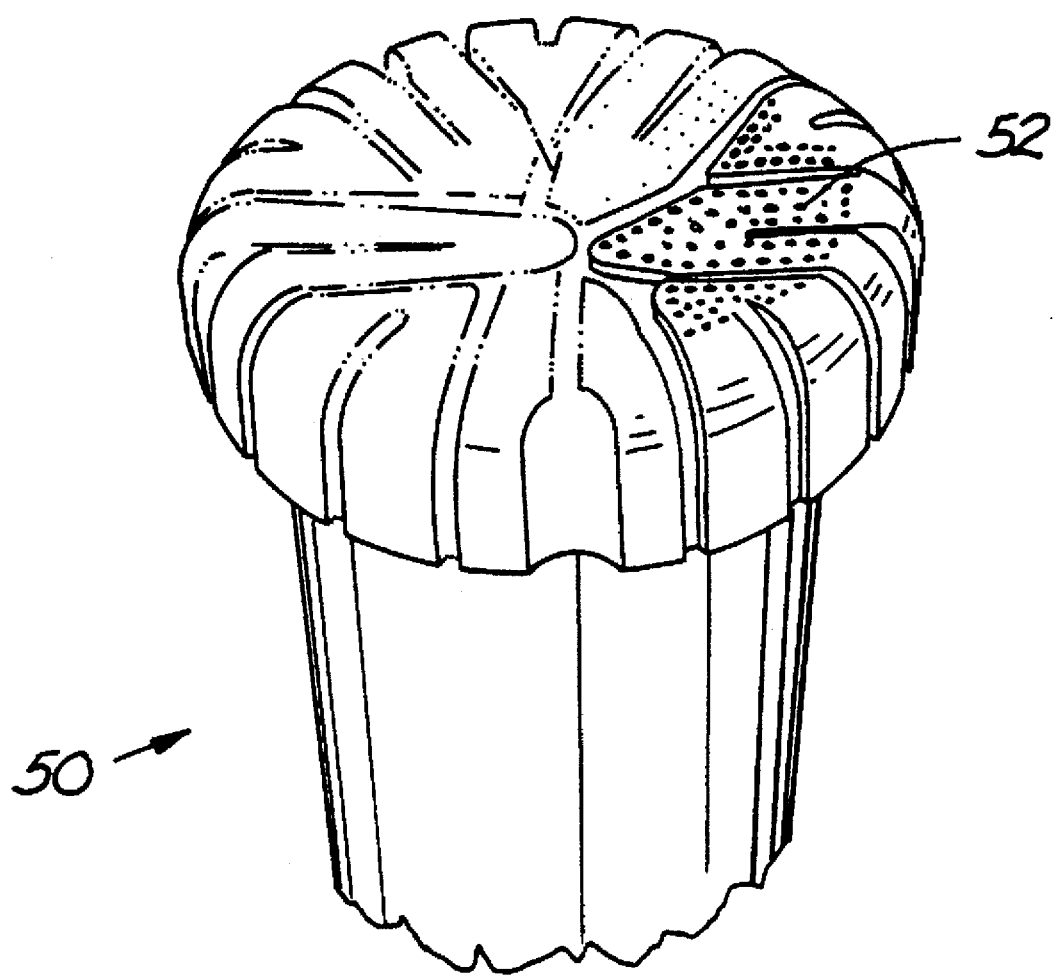
FIG. 3 is a perspective view of a tool drill bit that incorporates the present invention.

Referring to FIG. 3, there is illustrated therein a portion of a tool, generally designated as 50. The tool 50 has a forwardly facing surface to which are bonded discrete diamond elements 52.

COMPARATIVE EXAMPLES

The following comparative examples were made and tested and the test results are presented below.

Comparative Example A comprises a powder matrix mixture having a composition and size distribution as follows: about 67.10 weight percent macrocrystalline tungsten carbide having the following size distribution: between 18.0 and 22.0 weight percent of the macrocrystalline tungsten carbide particles have a size of −80 +120 mesh (the mesh size is made according to ASTM Standard E-11-70), between 25.0 to 30.0 weight percent of the macrocrystalline tungsten carbide particles have a size of −120 +170 mesh, between 29.0 weight percent and 33.0 weight percent of the macrocrystalline tungsten carbide particles have a size of −170 +230 mesh, between 18.0 weight percent and 22.0 weight percent of the macrocrystalline tungsten carbide particles have a size of −230 +325 mesh, and up to 5.0 weight percent of the macrocrystalline tungsten carbide particles have a size of −325 mesh. The matrix further contains about 30.90 weight percent crushed cast tungsten carbide particles having a size of −325 mesh, 1.00 weight percent iron and has an average particle diameter of between 3 micrometers and 5 micrometers, and 1.00 weight percent grade 4600 steel having a particle size of −325 mesh. The 4600 grade steel has the following nominal composition (weight percent): 1.57 weight percent nickel; 0.38 weight percent manganese; 0.32 weight percent silicon; 0.29 weight percent molybdenum; 0.06 weight percent carbon; and balance iron.

The infiltrant was MACROFIL 53. The composition of the MACROFIL 53 is set forth above. This powder mixture was placed in a mold along with MACROFIL 53 infiltrant, and heated at about 2200° F. until the infiltrant had adequately infiltrated the powder mass so as to bond it together. The mass was then allowed to cool.

Comparative Example B comprises a powder matrix mixture having a composition and size distribution as follows: about 68 weight percent macrocrystalline tungsten carbide having a size of −80 +325 mesh; 15 weight percent of macrocrystalline tungsten carbide having a size of −325 mesh; 15 weight percent of crushed cast tungsten carbide having a size of −325 mesh; and 2 weight percent nickel having a size of −325 mesh. This nickel is INCO type 123 from International Nickel Company and is a singular spike covered regular shaped powder. The chemical analysis and physical characteristics available from commercial literature reveal the following: The chemical analysis shows a composition of: 0.1 max. carbon, 0.15 max. oxygen, 0.001 max. sulfur, 0.01 max. iron, and balance nickel. The average particle size is 3–7 microns (Fisher Subsieve Size), the apparent density is 1.8–2.7 grams/cc, and the specific surface area is 0.34–0.44 m$^2$/g.

The infiltrant was MACROFIL 53. The composition of the MACROFIL 53 is set forth above. This powder mixture was placed in a mold along with MACROFIL 53 infiltrant, and heated at about 2200° F. until the infiltrant had adequately infiltrated the powder mass so as to bond it together. The mass was then allowed to cool.

Comparative Example C comprises a powder matrix mixture having a composition and size distribution as follows: about 67.0 weight percent crushed cast tungsten carbide having a particle size distribution as follows: between 18.0 and 22.0 weight percent of the crushed cast tungsten carbide particles have a size of −80 +120 mesh, between 25.0 to 30.0 weight percent of the crushed cast tungsten carbide particles have a size of −120 +170 mesh, between 29.0 weight percent and 33.0 weight percent of the crushed cast tungsten carbide particles have a size of −170 +230 mesh, between 18.0 weight percent and 22.0 weight percent of the crushed cast tungsten carbide particles have a size of −230 +325 mesh, and up to 5.0 weight percent of the crushed cast tungsten carbide particles have a size of −325 mesh. The component further has 31.0 weight percent crushed cast tungsten carbide having a particle size of −325 mesh, 1.0 weight percent iron having a particle size of −325 mesh, and 1.0 weight percent 4600 steel having a particle size of −325 mesh.

The infiltrant was MACROFIL 53. The composition of the MACROFIL 53 is set forth above. This powder mixture was placed in a mold along with MACROFIL 53 infiltrant, and heated at about 2200° F. until the infiltrant had adequately infiltrated the powder mass so as to bond it together. The mass was then allowed to cool.

ACTUAL EXAMPLES

The following actual examples of the present invention have been made and tested and the test results are also set forth below.

Example No. 1

Example No. 1 comprises a powder matrix mixture having a composition and size distribution as follows: 100 weight percent of crushed sintered cemented macrocrystalline tungsten carbide particles having a particle size of −140 +325 mesh. The composition of the cemented macrocrystalline tungsten carbide comprises 13 weight percent cobalt and 87 weight percent macrocrystalline tungsten carbide wherein the macrocrystalline tungsten carbide has an average particle size between about 5 micrometers and about 25 micrometers.

The infiltrant was MACROFIL 53. The composition of the MACROFIL 53 is set forth above. This powder mixture was placed in a mold along with MACROFIL 53 infiltrant, and heated at about 2200° F. until the infiltrant had adequately infiltrated the powder mass so as to bond it together. The mass was then allowed to cool.

Example No. 2

Example No. 2 comprises a powder mixture comprising the following: 100 weight percent of crushed sintered cemented macrocrystalline tungsten carbide particles having a particle size of −140 +270 mesh. The composition of the cemented macrocrystalline tungsten carbide comprises 6 weight percent cobalt and 94 weight percent macrocrystalline tungsten carbide wherein the tungsten carbide has an average particle size between about 5 micrometers and about 25 micrometers.

The infiltrant was MACROFIL 53. The composition of the MACROFIL 53 is set forth above. This powder mixture was placed in a mold along with MACROFIL 53 infiltrant, and heated at about 2200° F. until the infiltrant had adequately infiltrated the powder mass so as to bond it together. The mass was then allowed to cool.

Example No. 3

Example No. 3 comprises a powder mixture that has the following composition and particle size distribution:

(a) about 50.25 weight percent of the mixture is macrocrystalline tungsten carbide particles with a particle size of −80 +325 mesh; and (b) about 25.00 weight percent of the mixture is crushed sintered cemented macrocrystalline tungsten carbide particles of a size of −120 mesh, and has the following composition: about 6 weight percent cobalt, a maximum of 1 weight percent iron, a maximum of 1.0 weight percent tantalum, a maximum of 1.0 weight percent titanium, a maximum of 0.5 weight percent niobium, a maximum of 0.5 weight percent of other impurities and the balance macrocrystalline tungsten carbide having an average particle size of between about 5 micrometers and about 25 micrometers; and (c) about 23.25 weight percent of the mixture is cast tungsten carbide having a particle size of −270 mesh with superfines removed;

(d) about 0.75 weight percent of the mixture is grade 4600 steel having particle size of −325 mesh; and (e) about 0.75 weight percent of the mixture is iron having an average particle size of 3–5 microns.

This powder mixture was placed in a mold along with the MACROFIL 53 infiltrant, and heated at about 2200° F. until the infiltrant adequately infiltrated the powder mass so as to bond it together. The mass was then allowed to cool.

Example No. 4

Example No. 4 comprises a powder mixture that has the following composition and particle size distribution:

(a) about 33.50 weight percent of the mixture is macrocrystalline tungsten carbide particles with a particle size of −80 +325 mesh;

(b) about 50.00 weight percent of the mixture is crushed sintered cemented macrocrystalline tungsten carbide particles of a size of −120 mesh, and having the following composition: about 6 weight percent cobalt, a maximum of 1 weight percent iron, a maximum of 1.0 weight percent tantalum, a maximum of 1.0 weight percent titanium, a maximum of 0.5 weight percent niobium, a maximum of 0.5 weight percent of other impurities and the balance macrocrystalline tungsten carbide having an average particle size of between about 5 micrometers to about 25 micrometers;

(c) about 15.50 weight percent of the mixture is cast tungsten carbide having a particle size of −270 mesh with the superfines removed;

(d) about 0.50 weight percent of the mixture is grade 4600 steel having a particle size of −325 mesh; and (e) about 0.50 weight percent of the mixture is iron having an average particle size of 3–5 microns.

This powder mixture was placed in a mold along with a MACROFIL 53 infiltrant, and was heated at about 2200° F. until the infiltrant adequately infiltrated the powder mass so as to bond it together. The mass was then allowed to cool.

Example No. 5

Example No. 5 comprises a powder mixture having the following composition and particle size distribution:

(a) about 16.75 weight percent of the mixture is macrocrystalline tungsten carbide particles with a particle size of −80 +325 mesh;

(b) about 75.00 weight percent of the mixture is crushed sintered cemented macrocrystalline tungsten carbide particles of a particle size of −120 mesh, and having the following composition: about 6 weight percent cobalt, a maximum of 1 weight percent iron, a maximum of 1.0 weight percent tantalum, a maximum of 1.0 weight percent titanium, a maximum of 0.5 weight percent niobium, a maximum of 0.5 weight percent of other impurities and the balance macrocrystalline tungsten carbide having an average particle size between about 5 micrometers and about 25 micrometers;

(c) about 7.75 weight percent of the mixture is cast tungsten carbide having a particle size of −270 mesh with superfines removed;

(d) about 0.25 weight percent of the mixture is grade 4600 steel with a particle size of −325 mesh; and (e) about 0.25 weight percent of the mixture is iron, having an average particle size of 3–5 microns.

This powder mixture was placed in a mold along with a MACROFIL 53 infiltrant, and heated at about 2200° F. until the infiltrant adequately infiltrated the powder mass so as to bond it together. The mass was then allowed to cool.

Example No. 6

Example No. 6 comprises a powder mixture having the following composition and particle size distribution: about 100 weight percent of the mixture is crushed sintered cemented macrocrystalline tungsten carbide particles with a particle size of −120 mesh and having the following composition: about 6 weight percent cobalt, a maximum of 1 weight percent iron, a maximum of 1.0 weight percent tantalum, a maximum of 1.0 weight percent titanium, a maximum of 0.5 weight percent niobium, a maximum of 0.5 weight percent of other impurities and the balance macrocrystalline tungsten carbide having an average particle size of between about 5 micrometers and about 25 micrometers.

This powder mixture was placed in a mold along with a MACROFIL 53 infiltrant, and was heated at about 2200° F. until the infiltrant had adequately infiltrated the powder mass so as to bond it together. The mass was then allowed to cool.

TEST RESULTS

Tests for impact strength were conducted according to a procedure using an impact toughness machine. The machine had a hammer which when dropped created an impact loading force on a test specimen. The load required to break the specimen and the time it took to break the specimen were used to calculate the impact strength. This test was conducted along the lines of the charpy V-notch impact test in ASTM Standard E23, except that the specimen did not have the V-notch.

Tests for the transverse rupture strength were conducted according to a procedure where a cylindrical pin of the infiltrated material was placed in a fixture. A load was then exerted on the pin until failure. The transverse rupture strength was then calculated based upon the actual load and the dimensions of the pin specimen. Tests for hardness were conducted according to the ASTM Standard B347-85. The results of the testing for impact strength, transverse rupture strength and hardness are set forth below for the six examples and the three comparative examples.

| Example No. 1 | |
| --- | --- |
| Impact Strength | 4.728 ft-lbs |
| Transverse Rupture Strength | 136 ksi |
| Hardness | 29.2 Rockwell C |
| Example No. 2 | |
| Impact Strength | 6.792 ft-lbs |
| Transverse Rupture Strength | 184 ksi |
| Hardness | 44.8 Rockwell C |
| Example No. 3 | |
| Impact Strength | 3.516 ft-lbs |
| Transverse Rupture Strength | 105 ksi |
| Hardness | 33.6 Rockwell C |
| Example No. 4 | |
| Impact Strength | 4.819 ft-lbs |
| Transverse Rupture Strength | 131 ksi |

-continued

| | |
| --- | --- |
| Hardness | 42.2 Rockwell C |
| Example No. 5 | |
| Impact Strength | 5.222 ft-lbs |
| Transverse Rupture Strength | 153 ksi |
| Hardness | 44.3 Rockwell C |
| Example No. 6 | |
| Impact Strength | 8.356 ft-lbs |
| Transverse Rupture Strength | 162 ksi |
| Hardness | 42.5 Rockwell C |
| Example A | |
| Impact Strength | 2.730 ft-lbs |
| Transverse Rupture Strength | 116 ksi |
| Hardness | 38.3 Rockwell C |
| Example B | |
| Impact Strength | 3.094 ft-lbs |
| Transverse Rupture Strength | 114 ksi |
| Hardness | 31.5 Rockwell C |
| Example C | |
| Impact Strength | 2.466 ft-lbs |
| Transverse Rupture Strength | 96 ksi |
| Hardness | 38.7 Rockwell C |

The abrasion testing was done according to the Riley—Stoker method (ASTM Standard B611) using a counterbalance weight of 26 Kg. These results are set forth below:

| Sample | Weight Loss (Top/Bottom)* |
| --- | --- |
| Example No. 1 | 426.5/373.9 |
| Example No. 2 | 373.3/298.2 |
| Example No. 3 | 427.6/423.5 |
| Example No. 4 | 394.4/387.4 |
| Example No. 5 | 382.7/375.1 |
| Example No. 6 | 339.8/374.0 |
| Example A | 439.9/443.5 |
| Example B | 472.1/466.4 |
| Example C | 322.3/329.0 |

*of a coin

The units for the weight loss are grams per fifty wheel revolutions.

For the erosion test procedure, the testing consisted of subjecting coins made of the matrix material to a high pressure water plus sand abrasive stream for a set length of time and measuring the mass loss of the coin. The test parameters were set as follows:

| | |
| --- | --- |
| Water Pressure | 1000 psi |
| Sand Grit Size | ASTM 50–70 (fine) |
| Nozzle Size | #4–15 degree |
| Test Duration | 1 minute |
| Impingement Angle | 20 degrees |

The test setup consisted of a large, high pressure water pump unit, a barrel of sand, a trigger-operated nozzle delivery system, and the hoses to connect all of these together. The procedure used for testing was to weigh the coin, place it into the blast fixture, blast it for one minute, then weight it again to measure the loss due to erosion. The scale used to weigh the coin was a Mettler balance with a resolution of 0.002 grams. The coin was cleaned and dried prior to every weighing. Two tests were done on each side of the coin.

The sand and water flow rates were also monitored. The water flow rate averaged at about 2 gallons per minute throughout the entire test. The sand flow rate averaged about 0.65 lbs./minute for the test with some noticeable increase as the testing progressed. The accuracy of the sand flow measurement was about ±0.05 lbs/minute. This test procedure follows ASTM Standard G76, except that it uses a liquid jet instead of a gas jet.

These test results have been normalized to take into account the variations in sand flow. The weight loss is in grams.

| Sample | Weight Loss (Top/Bottom)* |
| --- | --- |
| Example No. 1 | 0.25/0.19 |
| Example No. 2 | 0.16/0.13 |
| Example No. 3 | 0.12/0.16 |
| Example No. 4 | 0.13/0.10 |
| Example No. 5 | 0.11/0.13 |
| Example No. 6 | 0.10/0.08 |
| Example A | 0.42/0.37 |
| Example B | 0.36/0.37 |
| Example C | 0.17/0.17 |

*of a coin

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A matrix powder for formation along with an infiltrant into a matrix, the matrix powder comprising: about 100 weight percent crushed sintered cemented macrocrystalline tungsten carbide particles having a particle size of −120 +400 mesh; and the composition of the crushed sintered cemented macrocrystalline tungsten carbide comprising between about 6 weight percent and about 13 weight percent cobalt and between about 87 weight percent and about 94 weight percent tungsten carbide.

2. The matrix powder of claim 1 wherein the composition of the crushed sintered cemented macrocrystalline tungsten carbide is about 6 weight percent cobalt and about 94 weight percent tungsten carbide, and the particle size of the crushed sintered cemented macrocrystalline tungsten carbide is about −140 +270 mesh.

3. The matrix powder of claim 1 wherein the composition of the crushed sintered cemented macrocrystalline tungsten carbide is about 13 weight percent cobalt and about 87 weight percent tungsten carbide, and the particle size of the crushed sintered cemented macrocrystalline tungsten carbide is about −140 +325 mesh.

4. The matrix powder of claim 1 wherein the crushed sintered cemented macrocrystalline tungsten carbide particles have the following composition about 6 weight percent cobalt, a maximum of 1 weight percent iron, a maximum of 1.0 weight percent tantalum, a maximum of 1.0 weight percent titanium, a maximum of 0.5 weight percent niobium, a maximum of 0.5 weight percent of other impurities and the balance macrocrystalline tungsten carbide having an average particle size of between about 5 micrometers and about 25 micrometers.

5. A powder for formation along with an infiltrant into a matrix, the powder comprising:

(a) up to about 50 weight percent of the powder being macrocrystalline tungsten carbide particles with a particle size of −80 +325 mesh;

(b) up to about 75 weight percent of the mixture being crushed sintered cemented macrocrystalline tungsten carbide particles of a particle size of −80 mesh, and having the following composition: about 6 weight percent cobalt, a maximum of 1 weight percent iron, a maximum of 1.0 weight percent tantalum, a maximum of 1.0 weight percent titanium, a maximum of 0.5 weight percent niobium, a maximum of 0.5 weight percent of other impurities and the balance macrocrystalline tungsten carbide having an average particle size between about 5 micrometers and about 25 micrometers;

(c) up to about 24 weight percent of the mixture being cast tungsten carbide having an average particle size of −270 mesh;

(d) between about 0.5 and about 1.5 weight percent of the mixture being principally iron having a particle size of between about 3 micrometers and about 5 micrometers.

6. The matrix powder of claim 5 wherein the iron component comprises between about 0.25 weight percent and about 0.75 weight percent of the mixture being grade 4600 steel having a particle size of −325 mesh, and between about 0.25 weight percent and about 0.75 weight percent of the mixture being iron, having a particle size of between about 3 to about 5 micrometers.

7. The matrix powder of claim 5 wherein the macrocrystalline tungsten carbide particles comprises about 50 weight percent of the mixture, and the crushed sintered cemented macrocrystalline tungsten carbide particles comprises about 25 weight percent of the mixture.

8. The matrix powder of claim 5 wherein the macrocrystalline tungsten carbide particles comprises about 34 weight percent of the mixture, and the crushed sintered cemented macrocrystalline tungsten carbide particles comprises about 50 weight percent of the mixture.

9. The matrix powder of claim 5 wherein the macrocrystalline tungsten carbide particles comprises about 17 weight percent of the mixture, and the crushed sintered cemented macrocrystalline tungsten carbide particles comprises about 75 weight percent of the mixture.

* * * * *